US009431939B2

(12) United States Patent
Burke (10) Patent No.: US 9,431,939 B2
(45) Date of Patent: Aug. 30, 2016

(54) ELECTRIC MOTOR OR GENERATOR

(71) Applicant: PROTEAN ELECTRIC LIMITED, Surrey (GB)

(72) Inventor: Richard Thomas Burke, Hook (GB)

(73) Assignee: PROTEAN ELECTRIC LIMITED (GB)

( * ) Notice: Subject to any disclaimer, the term of this patent is extended or adjusted under 35 U.S.C. 154(b) by 76 days.

(21) Appl. No.: 14/358,268

(22) PCT Filed: Oct. 3, 2012

(86) PCT No.: PCT/IB2012/055309
§ 371 (c)(1),
(2) Date: May 15, 2014

(87) PCT Pub. No.: WO2013/057614
PCT Pub. Date: Apr. 25, 2013

(65) Prior Publication Data
US 2014/0265970 A1 Sep. 18, 2014

(30) Foreign Application Priority Data
Oct. 19, 2011 (GB) .................................. 1118059.3

(51) Int. Cl.
*H02P 6/16* (2016.01)
*B60L 15/02* (2006.01)
(Continued)

(52) U.S. Cl.
CPC ............... *H02P 6/16* (2013.01); *B60L 15/025* (2013.01); *B60L 15/2045* (2013.01);
(Continued)

(58) Field of Classification Search
CPC ............ H02P 6/06; H02P 6/16; H02P 21/06; H02K 29/08; H02K 11/33; H02K 3/28; H02K 7/14; B60L 15/025; B60L 15/2045; B60L 2220/14; B60L 2220/44; G01D 5/145; Y02T 16/641; Y02T 10/72

USPC ............................. 318/400.38, 400.4, 400.37
See application file for complete search history.

(56) References Cited

U.S. PATENT DOCUMENTS 5,148,070 A * 9/1992 Frye .................. H02K 29/08
310/168
5,161,361 A * 11/1992 Talley ................... D01H 1/244
310/68 B (Continued)

FOREIGN PATENT DOCUMENTS

DE         3240580 A     5/1984
GB         2472297 A     2/2011

OTHER PUBLICATIONS

European Patent Office; International Search Report; Nov. 21, 2014; World Intellectual Property Organization; Rijswijk.

(Continued)

*Primary Examiner* — Rita Leykin
(74) *Attorney, Agent, or Firm* — The Mason Group Patent Specialists LLC; Valerie M. Davis (57) ABSTRACT

An electric motor or generator system comprising a rotor having a first set of magnet poles; a stator having a first sensor mounted on the stator and a second sensor mounted in substantially a diametrically opposite position on the stator relative to the first sensor, wherein the first sensor is arranged to output a first signal indicative of a first rotor flux angle associated with the first set of magnet poles as the rotor rotates relative to the stator and the second sensor is arranged to output a second signal indicative of a second rotor flux angle associated with the first set of magnet poles as the rotor rotates relative to the stator; and means arranged to determine a corrected rotor flux angle by averaging the first rotor flux angle indicated by the first sensor and the second rotor flux angle indicated by the second sensor.

6 Claims, 7 Drawing Sheets

(51) Int. Cl.
  *H02K 29/08* (2006.01)
  *H02P 21/06* (2016.01)
  *G01D 5/14* (2006.01)
  *B60L 15/20* (2006.01)
  *H02K 3/28* (2006.01)
  *H02K 7/14* (2006.01)

(52) U.S. Cl.
  CPC ............. *G01D 5/145* (2013.01); *H02K 11/33* (2016.01); *H02K 29/08* (2013.01); *H02P 21/06* (2013.01); *B60L 2220/14* (2013.01); *B60L 2220/44* (2013.01); *B60L 2240/421* (2013.01); *B60L 2270/142* (2013.01); *B60L 2270/145* (2013.01); *H02K 3/28* (2013.01); *H02K 7/14* (2013.01); *H02K 2213/12* (2013.01); *Y02T 10/641* (2013.01); *Y02T 10/643* (2013.01); *Y02T 10/72* (2013.01); *Y02T 10/7283* (2013.01)

(56) References Cited

U.S. PATENT DOCUMENTS

| | | | | |
|---|---|---|---|---|
| 5,202,610 | A * | 4/1993 | Frye | B65H 63/032 318/456 |
| 5,528,139 | A * | 6/1996 | Oudet | G01B 7/30 324/207.2 |
| 7,714,529 | B2 * | 5/2010 | Chen | H02P 6/16 318/400.38 |
| 8,040,087 | B2 * | 10/2011 | Hsu | H02P 6/16 318/400.01 |
| 8,525,458 | B2 * | 9/2013 | Hatano | H02K 11/215 318/400.38 |
| 2008/0258584 | A1 | 10/2008 | Chen et al. | |

OTHER PUBLICATIONS

European Patent Office; Written Opinion of the International Search Authority; Nov. 21, 2014; World Intellectual Property Organization; Rijswijk.

Intellectual Property Office; Search Report; Dec. 5, 2011; Intellectual Property Office; South Wales.

* cited by examiner

ELECTRIC MOTOR OR GENERATOR

The present invention relates to an electric motor or generator, and in particular an electric motor for rotating a wheel on a vehicle.

Permanent magnet synchronous electric motors operate via the production of a rotating magnetic field, which is typically formed via current flowing through coil windings mounted on a stator. The coil windings typically form a group of phase windings distributed around the stator that are coupled together. For a three phase electric motor or generator three sets of phase windings are connected together in either a star or a delta configuration.

Figure 1:
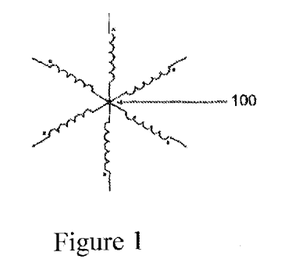
FIG. 1 illustrates a star connection for coil windings of a six phase electric motor or generator.

An illustration of a six phase electric motor or generator having six sets of phase windings connected in a star configuration is shown in FIG. 1, where one end of each of the windings are connected at a common point, known as a star point 100.

During operation of the electric motor or generator a different voltage phase is applied or generated across each group of phase windings. Accordingly, for an n-phase electric motor or generator an n-phase voltage is applied across the respective phase windings of the electric motor or generator.

The efficiency of a permanent magnet synchronous electric motor or generator is optimised by ensuring that the electrical phase, that is to say electrical phase angle, that is applied to the phase windings is synchronised with the magnetic field generated by permanent magnets, which are typically mounted on the rotor, such that the electrical phase angle is at a fixed phase offset to the magnetic field for a given torque/speed. In other words, the electrical phase angle is synchronised with the rotor magnetic flux angle.

To allow the electrical phase of the respective phase windings to be synchronised with the magnetic field, that is to say the rotor magnetic flux angle, generated by the permanent magnets mounted on the rotor, a ring of magnets or ring of multiple magnetic poles in the form of a commutation magnet ring is mounted on the rotor that has a matching configuration to the permanent magnets mounted on the rotor, which act as drive magnets, where the commutation magnets are used to estimate the rotor magnetic flux angle of the drive magnets.

Typically mounted on the stator is a Hall sensor that is arranged to measure the field strength from the commutation magnet ring. To allow the direction of the rotor to be determined and for improved accuracy a second Hall sensor is typically placed 90 electrical degrees away from the first Hall sensor.

Figure 2:
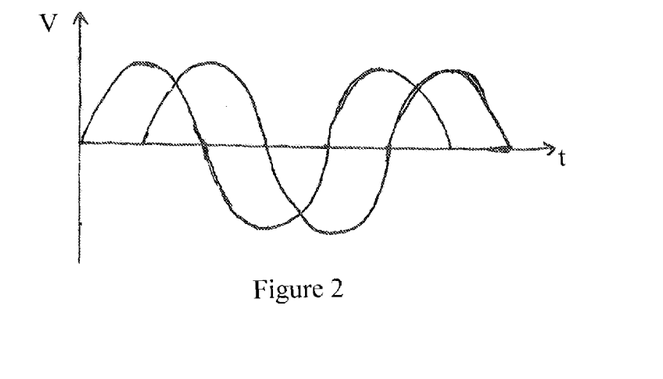
FIG. 2 illustrates the output from two Hall sensors separated by 90 electrical degrees mounted in an electric motor embodying the present invention.

As the rotor rotates relative to the stator the Hall sensor outputs an AC voltage signal that allows the rotor magnetic flux angle to be estimated. The rotor magnetic flux angle is determined from the signal output from the Hall sensor via trigonometric calculation. For a two Hall sensor configuration one Hall sensor represents the sine of the rotor flux angle and the second Hall sensor signal represents the cosine of the rotor flux angle. The output AC voltage signals have a frequency proportional to the speed of the rotor. By way of illustration, FIG. 2 represents the output from two Hall sensors mounted on the stator that have been separated by an electrical phase angle of approximately 90 degrees. As illustrated, two sinusoidal signals are output, where one output signal is shifted by approximately 90 degrees with respect to the other output signal.

However, due to manufacturing tolerances the magnets within the commutation magnet ring will typically be offset by varying amounts with respect to the permanent magnets mounted on the rotor. Although a general offset between the magnets in the commutation magnet ring and the corresponding permanent magnets mounted on the rotor can be calibrated out, a varying offset can result in an error between the measured and the actual rotor flux angle of the rotor. An error between the measured and the actual rotor flux angle of the rotor can result in the electrical phase of the respective phase windings not being fully synchronised with the magnetic field generated by permanent magnets mounted on the rotor.

Figure 3:
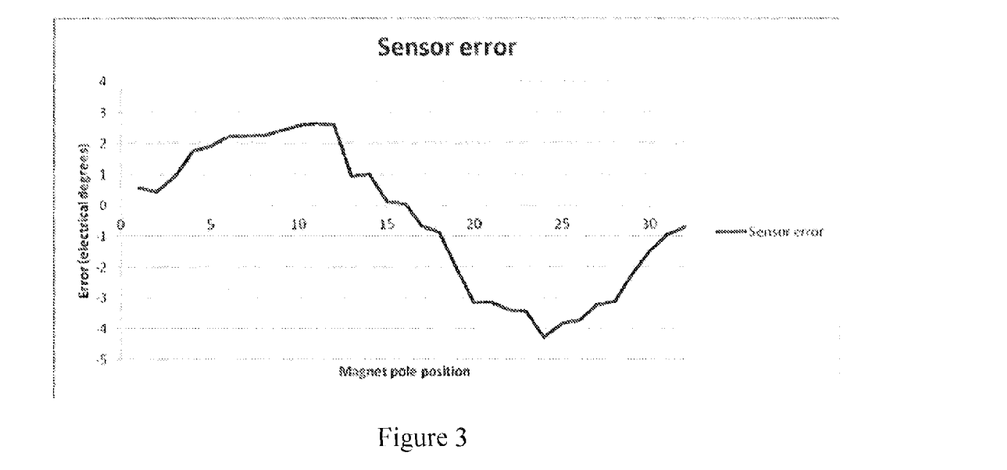
FIG. 3 illustrates a varying offset phase angle error for an electric motor having a single position sensor.

Typically the varying error between the measured and actual phase angle will be sinusoidal over a full mechanical revolution of the rotor relative to the stator, as illustrated in FIG. 3. The error in rotor flux angle can result in loss of torque, torque ripple, acoustic noise and a decrease in the efficiency of the electric motor.

It is desirable to improve this situation.

In accordance with an aspect of the present invention there is provided a method, an electric motor or generator according to the accompanying claims.

The invention as claimed provides the advantage of allowing the correlation between the commutation magnets and the drive magnets to be more accurately determined, thereby allowing the accuracy of the electrical phase angle determination to be increased with a resulting increase in operating efficiency of an electric motor or generator.

The present invention will now be described, by way of example, with reference to the accompanying drawings, in which.

The embodiment of the invention described is an electric motor for use in a wheel of a vehicle. The motor is of the type having a set of coils being part of the stator for attachment to a vehicle, radially surrounded by a rotor carrying a set of magnets for attachment to a wheel. For the avoidance of doubt, the various aspects of the invention are equally applicable to an electric generator having the same arrangement. As such, the definition of electric motor is intended to include electric generator. In addition, some of the aspects of the invention are applicable to an arrangement having the rotor centrally mounted within radially surrounding coils. However, as would be appreciated by a person skilled in the art, the present invention is applicable to other types of electric motors.

Figure 4:
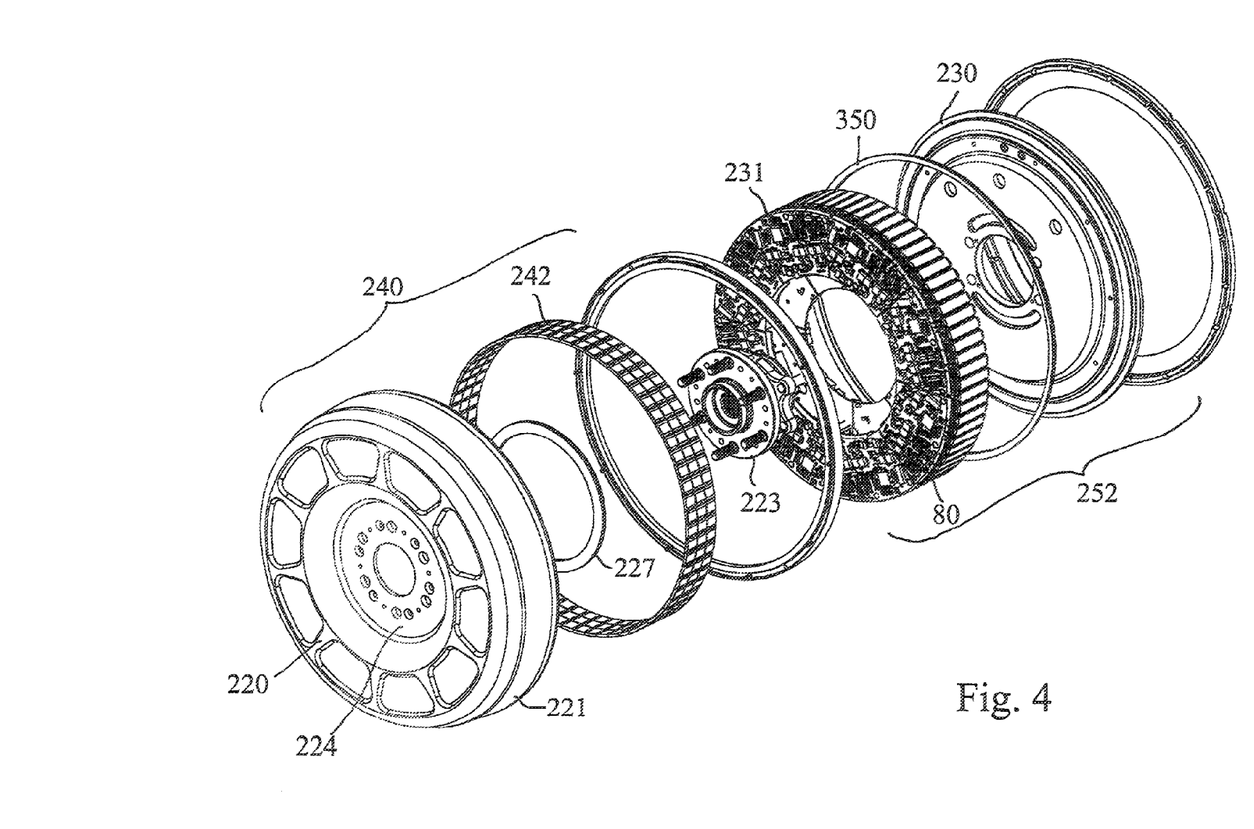
FIG. 4 illustrates an exploded view of a motor embodying the present invention.

As illustrated in FIG. 4, the in-wheel electric motor 40 includes a stator 252 comprising a rear portion 230 forming a first part of the housing of the assembly, and a heat sink and drive arrangement 231 comprising multiple coils and electronics to drive the coils. The coil drive arrangement 231 is fixed to the rear portion 230 to form the stator 252 which may then be fixed to a vehicle and does not rotate relative to the vehicle during use. The coils themselves are formed on tooth laminations to form coil windings, which together with the drive arrangement 231 and rear portion 230 form the stator 252.

A rotor 240 comprises a front portion 220 and a cylindrical portion 221 forming a cover, which substantially surrounds the stator 252. The rotor includes a plurality of permanent magnets 242 arranged around the inside of the cylindrical portion 221. For the purposes of the present embodiment 32 magnet pairs are mounted on the inside of the cylindrical portion 221. However, any number of magnet pairs may be used.

The magnets are in close proximity to the coils on the assembly 231 so that magnetic fields generated by the coils in the assembly 231 cooperate with the magnets 242 arranged around the inside of the cylindrical portion 221 of the rotor 240 to cause the rotor 240 to rotate. As the permanent magnets 242 are utilized to generate a drive torque for driving the electric motor, the permanent magnets are typically called drive magnets.

The rotor 240 is attached to the stator 252 by a bearing block 223. The bearing block 223 can be a standard bearing block as would be used in a vehicle to which this motor assembly is to be fitted. The bearing block comprises two parts, a first part fixed to the stator and a second part fixed to the rotor. The bearing block is fixed to a central portion 233 of the wall 230 of the stator 252 and also to a central portion 225 of the housing wall 220 of the rotor 240. The rotor 240 is thus rotationally fixed to the vehicle with which it is to be used via the bearing block 223 at the central portion 225 of the rotor 240. This has an advantage in that a wheel rim and tyre can then be fixed to the rotor 240 at the central portion 225 using the normal wheel bolts to fix the wheel rim to the central portion of the rotor and consequently firmly onto the rotatable side of the bearing block 223. The wheel bolts may be fitted through the central portion 225 of the rotor through into the bearing block itself. With both the rotor 240 and the wheel being mounted to the bearing block 223 there is a one to one correspondence between the angle of rotation of the rotor and the wheel.

Figure 5:
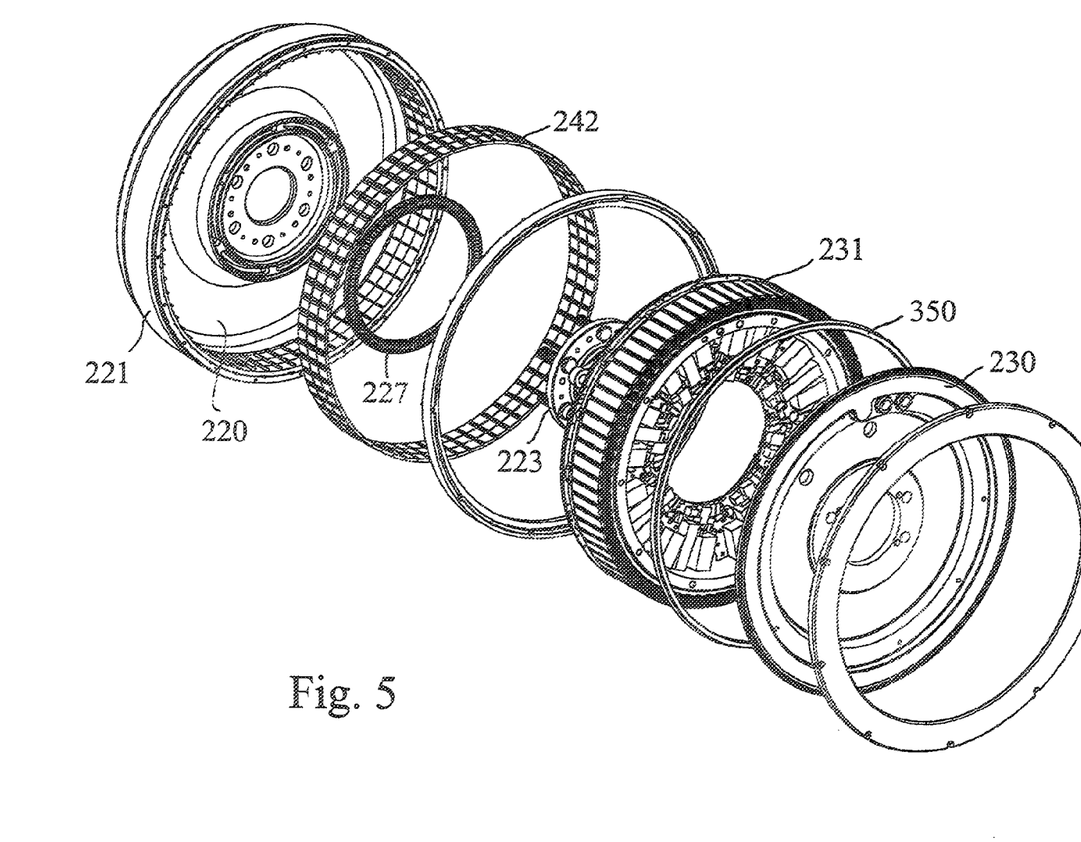
FIG. 5 is an exploded view of a motor of FIG. 4 from an alternative angle.

FIG. 5 shows an exploded view of the same assembly as FIG. 4 from the opposite side showing the stator 252 comprising the rear stator wall 230 and coil and electronics assembly 231. The rotor 240 comprises the outer rotor wall 220 and circumferential wall 221 within which magnets 242 are circumferentially arranged. As previously described, the stator 252 is connected to the rotor 240 via the bearing block at the central portions of the rotor and stator walls.

Additionally shown in FIG. 4 are control devices 80 carrying control electronics, otherwise known as motor drive controllers or inverters.

A V shaped seal 350 is provided between the circumferential wall 221 of the rotor and the outer edge of the stator housing 230.

The rotor also includes a set of magnets 227 for position sensing, otherwise known as commutation magnets, which in conjunction with sensors mounted on the stator allows for a rotor flux angle to be estimated. The rotor flux angle defines the positional relationship of the drive magnets to the coil windings. Alternatively, in place of a set of separate magnets the rotor may include a ring of magnetic material that has multiple poles that act as a set of separate magnets.

To allow the commutation magnets to be used to calculate a rotor flux angle, preferably each drive magnet has an associated commutation magnet, where the rotor flux angle is derived from the flux angle associated with the set of commutation magnets by calibrating the measured commutation magnet flux angle. To simplify the correlation between the commutation magnet flux angle and the rotor flux angle, preferably the set of commutation magnets has the same number of magnet or magnet pole pairs as the set of drive magnet pairs, where the commutation magnets and associated drive magnets are approximately radially aligned with each other. Accordingly, for the purposes of the present embodiment the set of commutation magnets has 32 magnet pairs, where each magnet pair is approximately radially aligned with a respective drive magnet pair.

At least two sensors, which in this embodiment are Hall sensors, are mounted on the stator in substantially diametrically opposite positions, that is to say approximately 180 mechanical degrees apart. The sensors are positioned so that as the rotor rotates each of the commutation magnets that form the commutation magnet ring respectively rotates past the respective sensors.

As the rotor rotates relative to the stator the commutation magnets correspondingly rotate past the respective sensors with each Hall sensor outputting an AC voltage signal, where each sensor outputs a complete voltage cycle of 360 electrical degrees for each magnet pair that passes the respective sensors.

Figure 6:
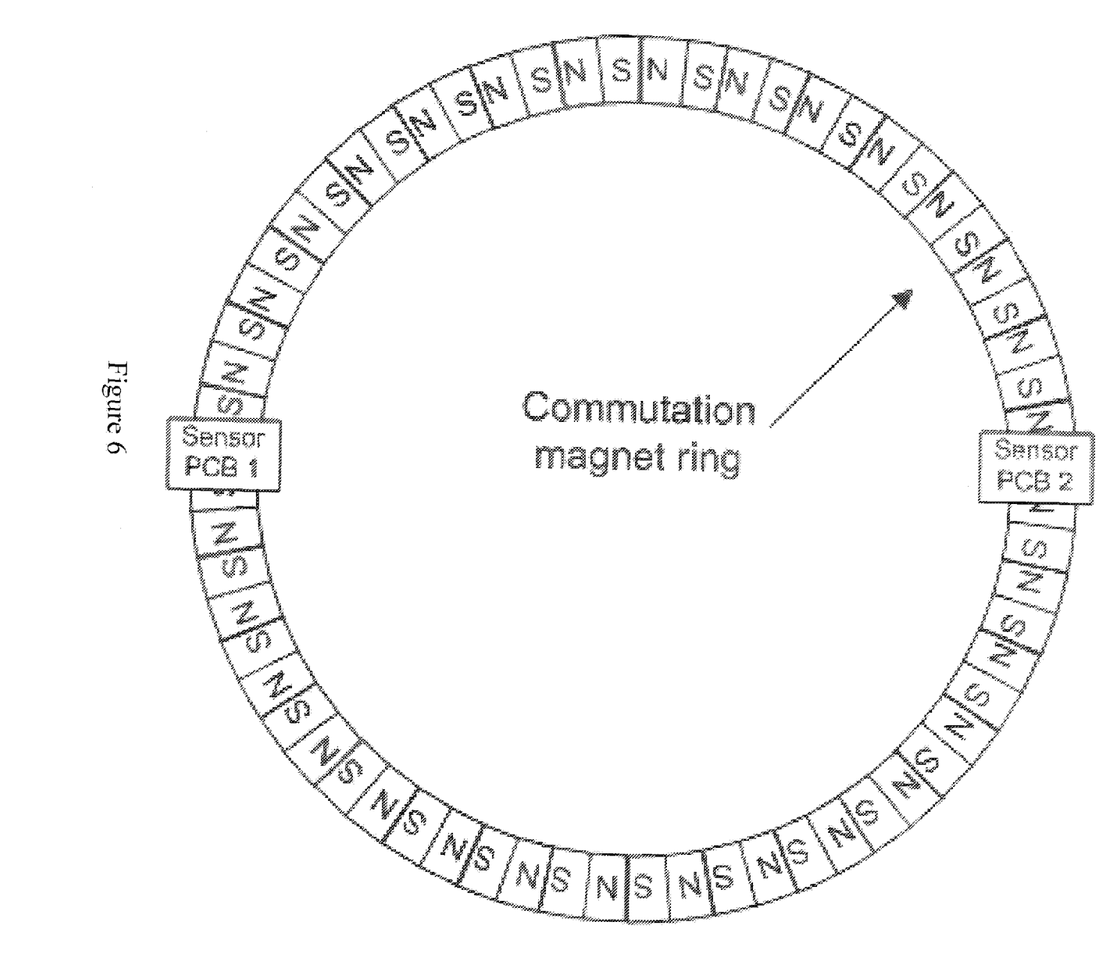
FIG. 6 illustrates a representation of a commutation magnet ring and two position sensors mounted in a motor embodying the present invention.

FIG. 6 illustrates a representation of a commutation magnet ring, having 32 magnet pairs, with two sensors positioned approximately 180 mechanical degrees apart with respect to the commutation magnet ring.

As described above, to aid in the determination of the direction of the rotor, each sensor may also have an associated second sensor placed 90 electrical degrees apart.

Figure 7:
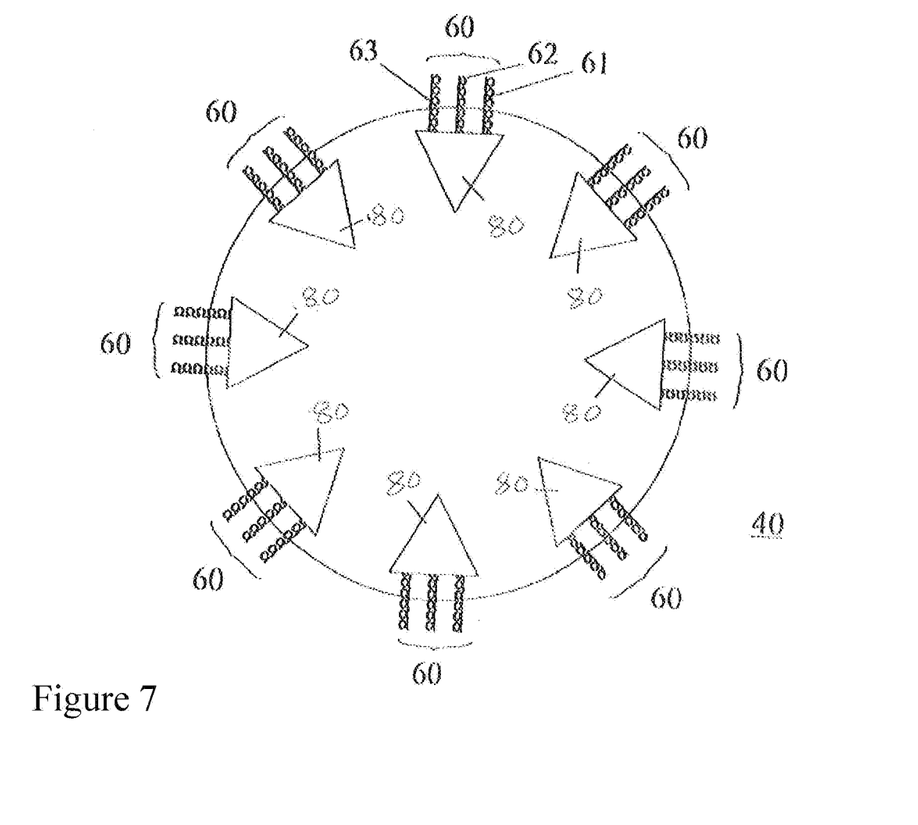
FIG. 7 illustrates an example arrangement of coil sets for an electric motor embodying the present invention.

As illustrated in FIG. 7, the motor 40 in this embodiment includes 8 coil sets 60 with each coil set 60 having three coil sub-sets 61, 62, 63 that are coupled to a respective control device 80, where each control device 80 and respective coil sub-sets form a three phase logical or sub electric motor that can be controlled independently of the other sub motors. The control devices 80 drive their respective sub motor with a three phase voltage supply, thereby allowing the respective coil sub-sets to generate a rotating magnetic field. Although the present embodiment describes each coil set 60 as having three coil sub-sets 61, 62, 63, the present invention is not limited by this and it would be appreciated that each coil set 60 could have two or more coil sub-sets. Equally, although the present embodiment describes an electric motor having eight coil sets 60 (i.e. eight sub motors) the motor could have one or more coil sets with an associated control device.

Each control device includes a three phase bridge inverter which, as is well known to a person skilled in the art, contains six switches. The three phase bridge inverter is coupled to the three subset coils of a coil set 60 to form a three phase electric motor configuration. Accordingly, as stated above, the motor includes eight three phase sub-motors, where each three phase sub-motor includes a control device 80 coupled to the three sub-set coils of a coil set 60.

Each three phase bridge inverter is arranged to provide PWM voltage control across the respective coil sub-sets 61, 62, 63 to provide a required torque for the respective sub-motors.

For a given coil set the three phase bridge switches of a control device 64 are arranged to apply a single voltage phase across each of the coil sub-sets 61, 62, 63.

Although the in-wheel electric motor described in the present embodiment includes a plurality of logical sub-motors, as person skilled in the art would appreciate the electric motor may be of a conventional design without the use of logical sub-motors.

In this embodiment, each control device 80 is substantially wedge-shaped. This shape allows multiple control devices 80 to be located adjacent each other within the motor, forming a fan-like arrangement.

The control device 80 switches can include semiconductor devices such as MOSFETs or IGBTs. In the present example, the switches comprise IGBTs. However, any suitable known switching circuit can be employed for controlling the current. One well known example of such a switching circuit is the three phase bridge circuit having six switches configured to drive a three phase electric motor. The six switches are configured as three parallel sets of two switches, where each pair of switches is placed in series and from a leg of the three phase bridge circuit.

The plurality of switches are arranged to apply an alternating voltage across the respective coil sub-sets.

As described above, the plurality of switches are configured to form an n-phase bridge circuit. Accordingly, as is well known to a person skilled in the art, the number of switches will depend upon the number of voltage phases to be applied to the respective sub motors. Although the current design shows each sub motor having a three phase construction, the sub motors can be constructed to have two or more phases.

The wires (e.g. copper wires) of the coil sub-sets can be connected directly to the switching devices as appropriate.

The control device 80 includes a number of electrical components for controlling the operation of the switches mounted on the control device 80. Examples of electrical components mounted on the control device 80 include control logic for controlling the operation of the switches for providing PWM voltage control and interface components, such as a CAN interface chip, for allowing the control device 80 to communicate with devices external to the control device 80, such as other control devices 80 or a master controller. Typically the control device 80 will communicate over the interface to receive torque demand requests and to transmit status information. Typically, the at least two sensors for determining the rotor flux angle will be mounted on separate control devices 80, which in turn are mounted to the stator. Optionally, for additional redundancy a sensor may be mounted to each control device 80.

Figure 8:
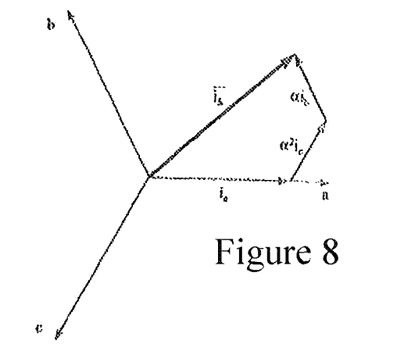
FIG. 8 illustrates a three phase stator current complex space vector.

The sinusoidal voltage waveforms generated in the electric motor by the control devices 80 under the control of a motor controller (not shown) are created using Field Orientation Control, where the resultant rotor flux and stator currents are represented by respective vectors which are separated by 120 degrees as illustrated in FIG. 8 by the three axis A, B, C.

As illustrated in FIG. 8, currents ia, ib, ic represent the instantaneous current in the respective stator coils in the A, B, and C axis of a three phase current reference frame, where the stator current vector is defined by $i_s = i_a + \alpha i_b + \alpha^2 i_c$, where $\alpha = e^{(j*2*\pi/3)}$.

Field Oriented Control is based on projections that transform a three phase time and speed dependent system into a two co-ordinate time invariant system, where a stator current or voltage component is aligned with a quadrature axis q and a magnetic flux component is aligned with a direct axis d.

Figure 9:
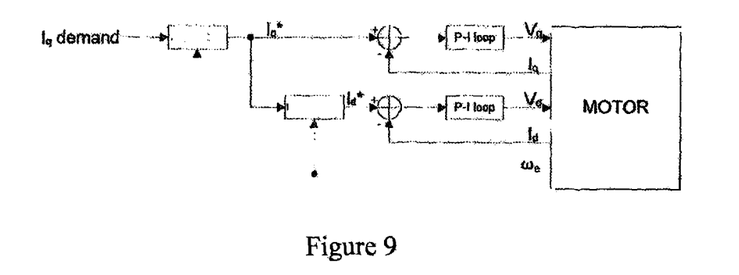
FIG. 9 illustrates a closed loop field oriented control system.

Using a closed loop control system, an example of one being illustrated in FIG. 9, a required torque τ, which is represented by an input $i_q$ value, and a required magnetic flux λ, which is represented by an input $i_d$ value, are compared with actual values measured from the electric motor.

It should be noted, however, that under normal circumstances a permanent magnet synchronous electric motor will typically have $i_d$ set to zero.

The closed loop control system 100 illustrated in FIG. 9 performs a comparison of a required torque value with measured values and performs the associated voltage and current control required to drive the electric motor using Park and Clarke Transforms.

Figure 10:
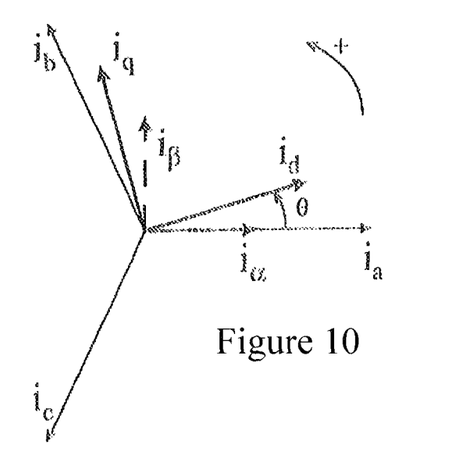
FIG. 10 illustrates a three phase stator current reference frame with a d, q rotating reference frame.

A Clarke Transform 101 uses measured values of at least two of the three phase voltage va, vb, and vc that are used to drive the electric motor to calculate voltages in a two phase orthogonal stator axis vα and vβ. A Park transformation is then performed by a Park Transform 102 to transform the two fixed co-ordinate stator axis vα and vβ to a two co-ordinate time invariant system vd and vq, which defines a d, q rotating reference frame. FIG. 10 illustrates the relationship of the stator voltage in the d,q rotating reference frame with respect to the two phase orthogonal stator axis vα and vβ and the a, b and c stationary reference frame.

Under normal drive conditions the rotor phase angle $\theta_r$, otherwise known as rotor flux angle of the drive magnets, which is defined by the rotor magnetic flux vector $\psi_R$, and the stator electrical phase angle $\theta_e$ should ideally be aligned with the q-axis, thereby maintaining synchronization between the rotor phase angle $\theta_r$ and the stator electrical phase angle $\theta_e$.

To allow the Park Transform 102 to derive a time invariant transformation the rotor phase angle $\theta_r$ is provided to the Park Transform, where the rotor phase angle $\theta_r$ is determined using the rotor commutation magnets and position sensors mounted on the control devices 80.

As described above, the rotor phase angle $\theta_r$ of the rotor is determined using two sensors, which in this embodiment are Hall sensors, which are mounted on separated control devices. For the purposes of the present embodiment, to improve accuracy each sensor forms part of a separate sensor assembly, with each sensor assembly having a second sensor, where both sensor assembly sensors are mounted 90 electrical degrees apart. Accordingly, for the purposes of the present embodiment, at least two sensor assemblies are mounted on separate control devices.

As described above, although only two sensors, or for the purposes of the present embodiment sensor assemblies, are required to be mounted in substantially diametrically opposite positions on the stator, each control device 80 may have a sensor or sensor assembly. By having a sensor mounted on a number of the control devices this has the advantage of providing redundancy should a fault occur with one set of sensors.

Although the present embodiment incorporates an active sensor, other forms of sensors could be used, for example inductive sensors that include a magnet and coil mounted adjacent to a toothed ring.

As described above, as the rotor rotates relative to the stator, the sensors output an AC voltage signal, where the outputted AC voltage signals have a frequency proportional to the speed of the rotor.

The phase of the voltage signal output by the respective sensors corresponds to the phase of the commutation magnet ring flux, that is to say flux angle. To determine the rotor phase angle $\theta_r$ to allow its use in the Park Transform, the commutation magnet ring flux, which is defined by the voltage signals output by the sensors, needs to be calibrated to correct for variations in relative position of each of the commutation magnets and their associated drive magnet.

To calibrate the commutation magnet flux angle for use as the rotor flux angle, an electrical angle offset for both sensors is defined with respect to the rotor magnet pairs, where the offset defines the difference between the measured electrical phase angle of a commutation magnet and the electrical phase angle of its associated drive magnet.

Each commutation sensor has a calibrated phase angle offset value, which represents the average difference between the commutation magnet flux angle and the rotor flux angle. However, since the commutation magnet pole pairs will typically not be equally spaced over a mechanical revolution, unless corrected there will be an additional offset error between the calculated commutation flux angle and the rotor flux angle that is broadly sinusoidal in shape even though the average error is zero.

Table 1 illustrates the sinusoidal nature of the offset error between the calculated commutation flux angle and the rotor flux angle resulting from unequal spacing between the commutation magnets and their respective drive magnet, where for each of the 32 magnet pairs a calibration offset is determined at both sensors. The final column of Table 1 contains an average of the determined offset values for each magnet pair at both sensors.

TABLE 1

| Magnet position | Error sensor 1 | Error sensor 2 | Average error |
|---|---|---|---|
| 1 | −3.834228516 | 3.696899414 | −0.068664551 |
| 2 | −3.751831055 | 3.757324219 | 0.002746582 |
| 3 | −3.235473633 | 3.641967773 | 0.20324707 |
| 4 | −3.131103516 | 2.625732422 | −0.252685547 |
| 5 | −2.213745117 | 2.103881836 | −0.054931641 |
| 6 | −1.488647461 | 2.054443359 | 0.282897949 |
| 7 | −0.961303711 | 0.939331055 | −0.010986328 |
| 8 | −0.708618164 | 0.340576172 | −0.184020996 |
| 9 | 0.565795898 | 0.010986328 | 0.288391113 |
| 10 | 0.455932617 | −0.131835938 | 0.16204834 |
| 11 | 0.972290039 | −0.417480469 | 0.277404785 |
| 12 | 1.7578125 | −2.63671875 | −0.439453125 |
| 13 | 1.90612793 | −2.153320313 | −0.123596191 |
| 14 | 2.224731445 | −2.66418457 | −0.219726563 |
| 15 | 2.25769043 | −3.169555664 | −0.455932617 |
| 16 | 2.246704102 | −2.911376953 | −0.332336426 |
| 17 | 2.411499023 | −2.845458984 | −0.21697998 |
| 18 | 2.576293945 | −2.587280273 | −0.005493164 |
| 19 | 2.653198242 | −2.48840332 | 0.082397461 |
| 20 | 2.598266602 | −2.235717773 | 0.181274414 |
| 21 | 0.933837891 | −0.977783203 | −0.021972656 |
| 22 | 1.016235352 | −0.488891602 | 0.263671875 |
| 23 | 0.126342773 | 0.192260742 | 0.159301758 |
| 24 | 0.082397461 | 0.181274414 | 0.131835938 |
| 25 | −0.670166016 | 1.334838867 | 0.332336426 |
| 26 | −0.895385742 | 1.939086914 | 0.521850586 |
| 27 | −2.070922852 | 2.905883789 | 0.417480469 |
| 28 | −3.153076172 | 2.83996582 | −0.156555176 |
| 29 | −3.153076172 | 3.19152832 | 0.019226074 |
| 30 | −3.394775391 | 3.224487305 | −0.085144043 |
| 31 | −3.460693359 | 3.334350586 | −0.063171387 |
| 32 | −4.290161133 | 3.13659668 | −0.576782227 |

The error values shown in Table 1 are in electrical angles and shown the electrical angle error relative to the rotor magnet flux assuming that the motor has been calibrated so that the average error is zero, that is to say an average offset value has already been applied to these values.

Figure 11:
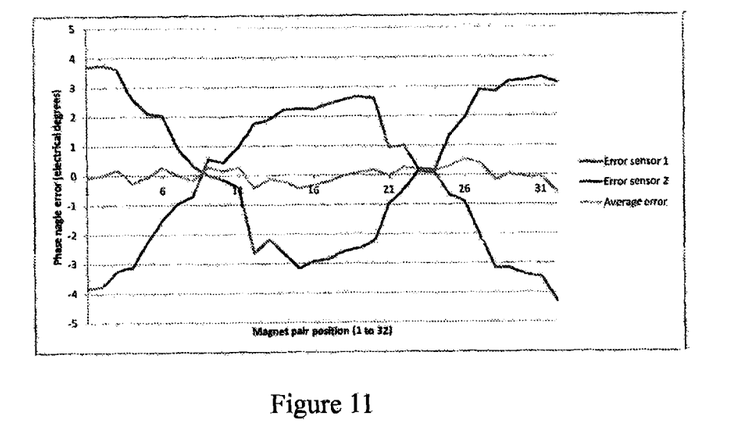
FIG. 11 illustrates a graphical representation of calibration data for the varying offset phase error as measured by two position sensors space substantially 180 degrees apart.

FIG. 11 illustrates a graphical representation of the calibration data, where the x axis represents the respective magnet pairs and the y axis represents the flux angle offset value. As illustrated in FIG. 11, the measured offset value at each sensor varies in a sinusoidal manner across the commutation magnet pairs with the measured values for both sensors being approximately 180 mechanical degrees out of phase. The out of phase sinusoidal variation between the two sensors is indicative of a varying offset error.

However, because the second sensor is 180 mechanical degrees from the first sensor, the error, which is sinusoidal in nature, between the commutation flux angle and the rotor flux angle is opposite in sign to that seen by the first sensor.

However, as the present embodiment only allows a single calibration offset to be stored for each sensor, that is to say only a single offset value per sensor can be used for all magnets, the separate offset error values per magnet pair listed in Table 1 cannot be used in the present embodiment to correct for the varying offset error.

However, because the two offset errors associated with the respective sensors that vary on top of the average offset error are opposite in sign and have approximately the same magnitude, to compensate for the varying offset error the respective control devices are arranged to use the average of the two flux angles measured by the two sensors that are positioned in substantially diametrically opposite positions on the stator. As the two varying offset error values are sinusoidal in nature and opposite in sign, by averaging the two measured flux angles this largely cancels out the varying offset error.

The final column in Table 1 provides an average of the varying offset error values for two sensors positioned in substantially diametrically opposite positions on the stator, which corresponds to the averaging of the phase angles measured by the two substantially diametrically opposite sensors where the main offset value for the general offset between the commutation magnets and drive magnets has already been corrected for.

As a result of averaging the varying offset errors for each sensor it can be seen that there is no offset error greater than 0.6 electrical degrees despite there being an error of more than 4 degrees in the signals from each sensor.

The rotor flux angle derived using the average rotor flux angle is used as the rotor flux angle $\theta_r$.

Using the calibration data, which is preferably stored within the electric motor, by comparing the determined varying offset error, derived from the measured phase angle, with the calibration data it is possible to determine the rotor position relative to the stator. Once the relative rotor position has been determined, should one of the sensors fail it will be possible to apply the appropriate varying offset error correction based on rotor position.

In an alternative embodiment, the varying offset error for more than two sensors may be used.

The two co-ordinate time invariant values vd and vq are compared with the required torque and required flux. Corrected $v_d^*$ and $v_q^*$ values are then input into an Inverse Park Transform 103 along with the rotor flux angle $\theta_r$ that has been derived from the measured commutation magnet flux angle to obtain a fixed co-ordinate $v\alpha^*$ and $v\beta^*$. The fixed co-ordinate $v\alpha$ and $v\beta$ values are input into an Inverse Clarke Transform 104 to derive the required three phase voltage values Va, Vb, Vc for driving the electric motor.

The three phase voltage values Va, Vb, Vc are fed to a modulation unit 105, which uses the three phase voltage values Va, Vb, Vc to determine a modulation scheme. Once the modulation scheme has been derived Space Vector Modulation is utilized to determine a switching sequence for the inverter switches to generate a three phase PWM voltage to represent the required sinusoidal three phase voltage to drive the electric motor with the required torque.

The invention claimed is:

1. An electric motor or generator system comprising a rotor having a first set of magnet poles; a stator having a first sensor mounted on the stator and a second sensor mounted on the stator approximately 180 mechanical degree apart from the sensor, wherein the first sensor is arranged to output a first signal indicative of a first rotor flux angle associated with the first set of magnet poles as the rotor rotates relative to the stator and the second sensor is arranged to output a second signal indicative of a second rotor flux angle associated with the first set of magnet poles as the rotor rotates relative to the stator wherein the first sensor and the second sensor are arranged, due to their mounted positions on the stator, such that a measured offset error at the first sensor and a measured offset error at the second sensor are opposite in sign; and means arranged to determine a corrected rotor flux angle by averaging the first rotor flux angle indicated by the first sensor and the second rotor flux angle indicated by the second sensor.

2. An electric motor or generator according to claim 1, wherein the first signal and second signal are generated in response to the first sensor and the second sensor passing the respective first set of magnet poles as the rotor rotates relative to the stator.

3. An electric motor or generator according to claim 2, wherein a plurality of coil windings are mounted on the stator and the rotor includes a second set of magnets, wherein the plurality of coil windings and second set of magnets are arranged to allow a torque to be applied to the rotor when current flows in the plurality of coil windings wherein the torque applied to the rotor is determined based on the phase of the current flowing in the respective plurality of coil windings and a rotor flux angle associated with the second set of magnets.

4. An electric motor or generator according to claim 3, wherein the averaging of the electrical phase angle indicated by the first sensor and the second sensor allow the rotor flux angle associated with the second set of magnets to be determined relative to the first set of magnet poles.

5. An electric motor or generator according to claim 1, wherein the first sensor and the second sensor are Halls sensors.

6. A method of operating an electric motor or generator comprising a rotor having a first set of magnet poles, a stator having a first sensor and a second sensor mounted on the stator, wherein a plurality of coil windings are mounted on the stator, and the rotor includes a second set of magnets, the method comprising:
 outputting, by the first sensor, a first signal indicative of a first rotor flux angle associated with the first set of magnet poles as the rotor rotates relative to the stator;
 outputting, by the second sensor, a second signal indicative of a second rotor flux angle associated with the first set of magnet poles as the rotor rotates relative to the stator, wherein the first signal and second signal are generated in response to the first sensor and the second sensor passing the respective first set of magnet poles as the rotor rotates relative to the stator, and the first signal and second signal are reflective of the first sensor and the second sensor being mounted on the stator approximately 180 mechanical degrees apart; wherein a measured offset error at the first sensor and a measured offset error at the second sensor are opposite in sign due to the first sensor and the second sensor being mounted on the stator approximately 180 mechanical degree apart;
 allowing, by the plurality of coil windings and second set of magnets, a torque to be applied to the rotor when current flows in the plurality of coil windings, wherein the torque applied to the rotor is determined based on the phase of the current flowing in the respective plurality of coil windings and a rotor flux an le associated with the second set of magnets;
 determining a corrected rotor flux angle by averaging the first rotor flux angle indicated by the first sensor and the second rotor flux angle indicated by the second sensor;
 applying an alternating voltage to the respective plurality of coil windings, wherein the phase of the alternating voltage is based on the corrected rotor flux angle.

\* \* \* \* \*